US006795473B1

(12) United States Patent
Kleinschmidt et al.

(10) Patent No.: US 6,795,473 B1
(45) Date of Patent: Sep. 21, 2004

(54) NARROW BAND EXCIMER LASER WITH A PRISM-GRATING AS LINE-NARROWING OPTICAL ELEMENT

(75) Inventors: Juergen Kleinschmidt, Weissenfels (DE); Thomas Schroeder, Goettingen (DE)

(73) Assignee: Lambda Physik AG, Goettingen (DE)

( * ) Notice: Subject to any disclaimer, the term of this patent is extended or adjusted under 35 U.S.C. 154(b) by 368 days.

(21) Appl. No.: 09/602,184

(22) Filed: Jun. 22, 2000

Related U.S. Application Data

(60) Provisional application No. 60/173,993, filed on Dec. 30, 1999, provisional application No. 60/170,919, filed on Dec. 15, 1999, provisional application No. 60/167,835, filed on Nov. 29, 1999, and provisional application No. 60/140,532, filed on Jun. 23, 1999.

(51) Int. Cl.[7] ............................ H01S 3/22; H01S 3/223; H01S 3/097
(52) U.S. Cl. .......................... 372/57; 372/55; 372/58; 372/59; 372/60; 372/87
(58) Field of Search ........................... 372/55, 57, 58, 372/59, 60, 87, 32, 100, 102, 108, 99; 359/571

(56) References Cited

U.S. PATENT DOCUMENTS

| 3,471,800 A | 10/1969 | Congleton et al. ......... 331/94.5 |
| 3,546,622 A | 10/1970 | Peterson et al. ........... 331/94.5 |
| 3,609,586 A | 9/1971 | Danielmeyer et al. ...... 331/94.5 |
| 4,009,933 A | * 3/1977 | Firester ....................... 359/486 |
| 4,399,540 A | 8/1983 | Bucher ......................... 372/28 |
| 4,611,270 A | 9/1986 | Klauminzer et al. ........ 364/183 |

(List continued on next page.)

FOREIGN PATENT DOCUMENTS

| DE | 298 22 090 U 1 | 3/1999 | ............. H01S/3/08 |
| DE | 299 07 349 U 1 | 8/2000 | ........... H01S/3/086 |
| EP | 1 041 689 A1 | 10/2000 | ......... H01S/3/1055 |
| EP | 1 102 368 A2 | 5/2001 | ........... H01S/3/081 |
| EP | 1 119 083 A2 | 7/2001 | ............. H01S/3/08 |
| JP | 60 16479 | 1/1985 | ........... H01S/3/081 |
| JP | 8 274399 | 11/1986 | ........... H04S/3/104 |
| JP | 62 160783 | 7/1987 | ........... H01S/3/115 |
| JP | 2 152288 | 6/1990 | ........... H01S/3/106 |

OTHER PUBLICATIONS

Finkelstein et al., "A Rectilinear Transmission Grating and Applications," *JOSA*, vol. 43., 1953., pp. 335.

McKee T., "Spectral–narrowing Techniques for Excimer Laser Oscillators," *Can J Phys*. 1985, vol. 63., pp. 214–219.

Traub, W., "Constant–dispersion Grism Spectrometer for Channeled Spectra," *Optical Society of America*, Sep. 1990, vol. 7., No. 9., pp. 1779–1791.

(List continued on next page.)

*Primary Examiner*—Don Wong
*Assistant Examiner*—Armando Rodriguez
(74) *Attorney, Agent, or Firm*—Stallman & Pollock LLP

(57) ABSTRACT

An excimer or molecular fluorine laser system includes a laser chamber filled with a gas mixture at least including a halogen-containing species and a buffer gas, and multiple electrodes with the laser chamber connected to a discharge circuit energizing the gas mixture. The laser chamber is within a laser resonator generating an output beam. The resonator includes a line-narrowing package for reducing a bandwidth of the output beam. The line-narrowing package includes a grating or grism element for use with a highly reflective (HR) and/or an anti-reflective (AR) dielectric coating. The grating may serve as a resonator reflector having a dielectric HR coating. The grating may be disposed before a HR mirror and thus have a dielectric AR or HR coating when the grating is configured in transmission or reflection mode, respectively. The grating may be used as an output coupler, and may be partially reflective with or without a coating. The grism may have a dielectric AR coating on any transmissive surface and a dielectric HR coating on any reflective surface.

58 Claims, 4 Drawing Sheets

U.S. PATENT DOCUMENTS

| | | | | |
|---|---|---|---|---|
| 4,616,908 A | | 10/1986 | King .......................... 350/576 |
| 4,696,012 A | | 9/1987 | Harshaw ....................... 372/99 |
| 4,803,696 A | | 2/1989 | Pepper et al. .................. 372/95 |
| 4,829,536 A | | 5/1989 | Kajiyama et al. .............. 372/57 |
| 4,856,018 A | | 8/1989 | Nozue et al. .................. 372/98 |
| 4,860,300 A | | 8/1989 | Baumler et al. .............. 372/57 |
| 4,873,692 A | | 10/1989 | Johnson et al. ............... 372/20 |
| 4,905,243 A | | 2/1990 | Lokai et al. ................... 372/32 |
| 4,972,429 A | | 11/1990 | Herbst ....................... 372/100 |
| 4,975,919 A | | 12/1990 | Amada et al. ................ 372/33 |
| 4,977,563 A | | 12/1990 | Nakatani et al. .............. 372/32 |
| 5,080,465 A | * | 1/1992 | Laude ........................ 359/571 |
| 5,095,492 A | | 3/1992 | Sandstrom .................. 372/102 |
| 5,142,543 A | | 8/1992 | Wakabayashi et al. ........ 372/32 |
| 5,150,370 A | | 9/1992 | Furuya et al. .............. 372/106 |
| 5,221,823 A | | 6/1993 | Usui ....................... 219/121.78 |
| 5,226,050 A | | 7/1993 | Burghardt .................... 372/20 |
| 5,373,515 A | | 12/1994 | Wakabayashi et al. ........ 372/20 |
| 5,383,199 A | * | 1/1995 | Laudenslager ............... 372/25 |
| 5,396,514 A | | 3/1995 | Voss ............................ 372/57 |
| 5,404,366 A | | 4/1995 | Wakabayashi et al. ........ 372/29 |
| 5,406,571 A | | 4/1995 | Bucher et al. ................. 372/20 |
| 5,440,574 A | | 8/1995 | Sobottke et al. .............. 372/34 |
| 5,440,578 A | | 8/1995 | Sandstrom .................... 372/59 |
| 5,479,431 A | | 12/1995 | Sobottke et al. .............. 372/92 |
| 5,532,880 A | | 7/1996 | Robb ......................... 359/665 |
| 5,559,584 A | | 9/1996 | Miyaji et al. ................. 355/73 |
| 5,559,816 A | | 9/1996 | Basting et al. ................ 372/27 |
| 5,596,456 A | | 1/1997 | Luecke ....................... 359/831 |
| 5,596,596 A | | 1/1997 | Wakabayashi et al. ...... 372/102 |
| 5,625,499 A | | 4/1997 | Chen .......................... 359/831 |
| 5,652,681 A | * | 7/1997 | Chen .......................... 359/831 |
| 5,659,419 A | | 8/1997 | Lokai et al. ................. 359/330 |
| 5,663,973 A | | 9/1997 | Stamm et al. ................ 372/20 |
| 5,684,822 A | | 11/1997 | Partlo .......................... 372/95 |
| 5,729,565 A | | 3/1998 | Meller et al. ................. 372/87 |
| 5,761,236 A | | 6/1998 | Kleinschmidt et al. ..... 372/100 |
| 5,763,855 A | | 6/1998 | Shioji .................... 219/121.84 |
| 5,802,094 A | | 9/1998 | Wakabayashi et al. ........ 372/57 |
| 5,811,753 A | | 9/1998 | Weick et al. .......... 219/121.78 |
| 5,835,520 A | | 11/1998 | Das et al. ..................... 372/57 |
| 5,852,627 A | | 12/1998 | Ershov ....................... 372/108 |
| 5,856,991 A | | 1/1999 | Ershov ........................ 372/57 |
| 5,898,725 A | | 4/1999 | Fomenkov et al. ......... 372/102 |
| 5,901,163 A | | 5/1999 | Ershov ........................ 372/50 |
| 5,917,849 A | | 6/1999 | Ershov ....................... 372/102 |
| 5,925,878 A | * | 7/1999 | Challener ................... 250/225 |
| 5,946,337 A | | 8/1999 | Govorkov et al. ............ 372/92 |
| 5,970,082 A | | 10/1999 | Ershov ....................... 372/102 |
| 5,978,409 A | * | 11/1999 | Das ........................... 372/100 |
| 5,999,318 A | | 12/1999 | Morton et al. .............. 359/572 |
| 6,014,206 A | | 1/2000 | Basting et al. ............. 356/138 |
| 6,016,479 A | | 1/2000 | Taricani, Jr. ................. 705/19 |
| 6,018,537 A | | 1/2000 | Hofmann et al. ............. 372/25 |
| 6,028,879 A | | 2/2000 | Ershov ........................ 372/57 |
| 6,028,880 A | | 2/2000 | Carlesi et al. ................ 372/58 |
| 6,061,382 A | | 5/2000 | Govorkov et al. .......... 372/101 |
| 6,115,401 A | * | 9/2000 | Scobey ....................... 372/100 |
| 6,128,323 A | | 10/2000 | Myers et al. .................. 372/38 |
| 6,154,470 A | | 11/2000 | Basting et al. ................ 372/19 |
| 6,106,832 A | * | 12/2000 | Kleinschmidt ............... 372/57 |
| 6,381,256 B1 | * | 4/2002 | Stamm et al. ................ 372/19 |
| 2002/0114362 A1 | * | 8/2002 | Volger et al. ................. 372/32 |

OTHER PUBLICATIONS

Hulzsch, R., "Gitterprismen," *Photonik*, Sep. 1998., pp. 40–41. This publication is in German.

Demtroder, W., Laser Spectroscopy Springer, *Berlin Heidelberg*, 1996, pp. 99–221.

Geyer et al., Double Gratings–Prism, *Astr. Astraphys.*, vol. 148., pp. 312.

Translation from German to English. Rainer Hultzsch, "Grating Prisms." Hulzsch R., "Gitterprismen," *Photonik*, Sep. 1998. pp. 40–41.

* cited by examiner

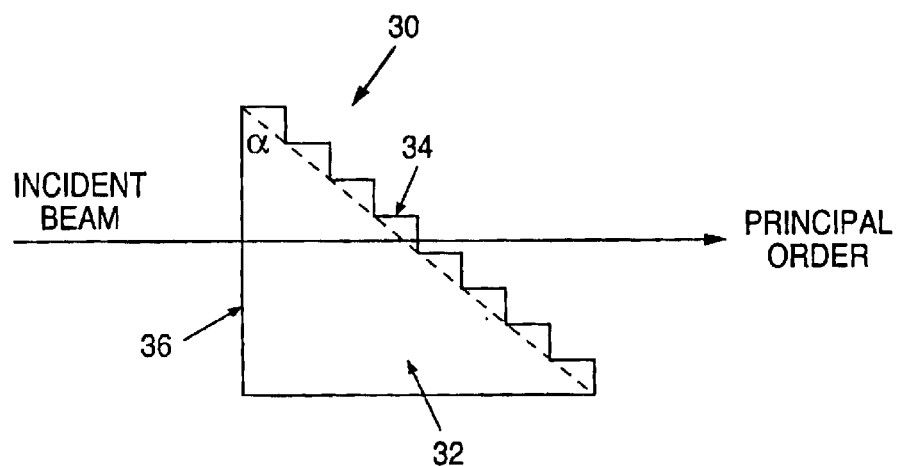
FIG. 2
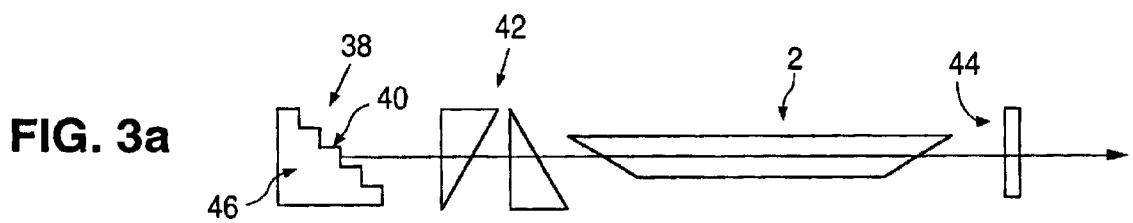
FIG. 3a
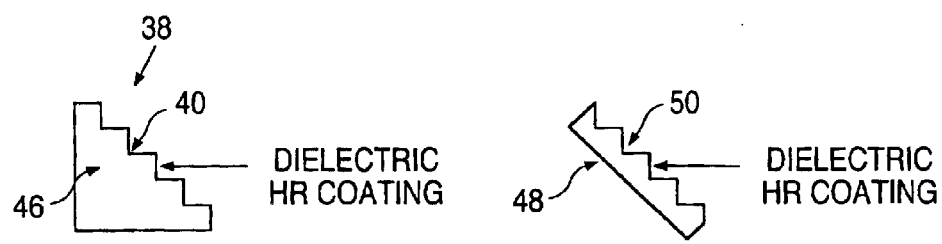
FIG. 3b  FIG. 3c

NARROW BAND EXCIMER LASER WITH A PRISM-GRATING AS LINE-NARROWING OPTICAL ELEMENT

PRIORITY

This application claims the benefit of priority to U.S. provisional patent application No. 60/140,532, filed Jun. 23, 1999, 60/173,993, filed Dec. 30, 1999, 60/170,919, filed Dec. 15, 1999 and 60/167,835, filed Nov. 29, 1999, each of which is hereby incorporated by reference.

BACKGROUND OF THE INVENTION

1. Field of the Invention

The invention relates to line-narrowed excimer and molecular fluorine excimer and molecular fluorine laser systems, and particularly to a grating arrangement having a dielectric coating with comparatively high damage thresholds to radiation induced degradation which can be used as a line narrowing element in line narrowed excimer lasers, and also particularly to a line-narrowed laser resonator including a grating-prism element, or grism, preferably having a dielectric, antireflection (AR) coating on any transmitting surfaces and a dielectric, highly reflective (HR) coating on any reflection surfaces.

2. Discussion of the Related Art

Semiconductor manufacturers are currently using deep ultraviolet (DUV) lithography tools based on KrF-excimer laser systems operating around 248 nm, as well as the following generation of ArF-excimer laser systems operating around 193 nm. The ArF and KrF lasers have a broad characteristic bandwidth around 600 pm (FWHM). Vacuum UV (VUV) will use the F2-laser which characteristically emits two or three closely spaced lines around 157 nm.

It is important for their respective applications to the field of sub-quarter micron silicon processing that each of the above laser systems become capable of emitting a narrow spectral band of known bandwidth and around a very precisely determined and finely adjustable absolute wavelength. Techniques for reducing bandwidths by special resonator designs to less than 100 pm (for ArF and KrF lasers) for use with all-reflective optical imaging systems, and for catadioptric imaging systems to less than 0.6 pm, are being continuously improved upon.

For the application of excimer lasers as light sources for steppers and/or scanners for photographic microlithography, it is desired to have laser emission within a range that is much small than the natural linewidth which is approximately 300 to 400 pm for ArF and KrF lasers. The extent of the desired line narrowing depends on the imaging optics of the stepper/scanner devices. The desired bandwidth for catadioptic systems is less than around 50 pm, and for refractive optics it is less than around 0.8 pm. Currently, used systems for the KrF laser emitting around 248 nm have a bandwidth around 0.6 pm. To improve the resolution of the projection optics, a narrower laser bandwidth is desired for excimer laser systems of high reliability and very small bandwidth of 0.4 pm or less.

A line-narrowed excimer or molecular fluorine laser used for microlithography provides an output beam with specified narrow spectral linewidth. It is desired that parameters of this output beam such as wavelength, linewidth, and energy and energy dose stabilty be reliable and consistent. Narrowing of the linewidth is generally achieved through the use of a linewidth narrowing and/or wavelength selection and wavelength tuning module (hereinafter "line-narrowing module") consisting most commonly of prisms, diffraction gratings and, in some cases, optical etalons.

The line-narrowing module typically functions to disperse incoming light angularly such that light rays of the beam with different wavelengths are reflected at different angles. Only those rays fitting into a certain "acceptance" angle of the resonator undergo further amplification, and eventually contribute to the output of the laser system.

For the broadband excimer lasers such as the ArF and KrF lasers mentioned above, the central wavelength of the line-narrowed output beam may be tuned within their respective characteristic spectra. Tuning is typically achieved by rotating the grating or highly reflective (HR) mirror of the line-narrowing module.

Excimer lasers typically use planar gratings for narrow linewidth oscillation. The bandwidth $\Delta\lambda$ of the radiation is nearly given by, for a Gaussian line shape:

$$\Delta\lambda \approx (\lambda \cdot \Delta\Theta)/2 \cdot m^{1/2} \cdot \tan\alpha \qquad (1)$$

$\lambda$=emission wavelength;
$\Delta\Theta$=divergence of the beam in front of the grating;
$\alpha$=blaze angle of the grating;
m=effective number of round trips of the beam in the laser resonator.

Typical grating substrates are made by Zerodure or ULE. A layer of epoxy is typically formed directly on the surface of the grating substrate, wherein the epoxy layer has a thickness between 12–40 $\mu$m. The epoxy surface is then typically coated by aluminum, wherein the thickness of the aluminum coating is between 10–30 $\mu$m.

A disadvantage of these types of gratings is that the aluminum absorbs more than 10% of the incident radiation power in the DUV spectral region within a very thin layer thickness. As a result, the gratings vary in their response to the exposure to high power laser beams by heating and aging. Moreover, nonuniform heating of the grating may substantially degrade its quality by, for example, distorting the wavefront of the retroreflected beam. Quality and long term stability of the optical components, as well as assembly, determines the behavior of the line narrowing unit under irradiation conditions in the laser cavity. It is desired to have a grating assembly that features relatively low absorption and a low degree of performance variance due to heating and aging. It is particularly desired to have a grating that does not effect the retroreflected beam such as by distorting its wavefront.

SUMMARY OF THE INVENTION

It is therefore an object of the invention to provide a line-narrowing package for an excimer or molecular fluorine laser system for producing an output beam at substantially less than 1 pm, and particularly less than 0.6 pm.

It is another object to provide a dispersive line-narrowing element for producing substantial line-narrowing in an excimer or molecular fluorine laser system that experiences relatively low absorption of incident laser radiation, such response variance due to heating and aging and effects of nonuniform heating are also relatively low.

In accordance with the above objects, a grating element is provided for use with a line-narrowing package of an excimer or molecular fluorine laser including a HR dielectric coating. This grating having the dielectric HR coating is configured to be disposed in a laser resonator to disperse an incident beam and to retroreflect the beam as a resonator reflector element.

Further in accordance with the above objects, a grating element is provided for use with a line-narrowing package of an excimer or molecular fluorine laser including a dielectric AR coating. This grating having the dielectric AR coating is configured to be disposed in a laser resonator in front of a resonator reflector, such as a HR mirror or partially reflective outcoupling mirror.

Further in accordance with the above objects, a grism is provided for use with a line-narrowing package of an excimer or molecular fluorine laser, preferably having a dielectric AR coating on any transmissive surface and a dielectric HR coating on any reflective surface.

In a first aspect, the grism may be configured to be disposed in the laser resonator with the grating surface facing the discharge chamber and serving as a HR reflecting resonator reflector. The grism according to the first aspect has a dielectric HR coating on its grating surface.

In a second aspect, the grism may be configured to be disposed in the laser resonator with the prism portion facing the discharge chamber and the grating portion serving as a HR reflecting resonator reflector. The grism according to the second aspect has a dielectric HR coating on the grating surface and a dielectric AR coating on the entry surface of the prism portion.

In a third aspect, the grism may be configured to be disposed in the laser resonator with the grating surface facing the discharge chamber and the rear surface of the prism portion serving as a HR reflecting resonator reflector. The grism according to the third aspect has a dielectric AR coating on the grating surface and a dielectric HR coating on the back surface of the prism portion. The grism may be disposed at a selected orientation with respect to the longitudinal cross section of the resonator, such that the prism portion of the grism may serve as a beam expanding prism.

In a fourth aspect, the grism may be configured to be disposed in the laser resonator with preferably the grating surface and alternatively the prism portion facing the discharge chamber, wherein neither the grating surface nor the entry/exit surface of the prism portion serves as a HR reflecting resonator reflector. The grism according to the fourth aspect has a dielectric AR coating on each of the grating surface and the entry/exit surface of the prism portion. In use, the grism is preferably disposed in front of a HR resonator reflecting mirror or partially reflecting outcoupling mirror. The grism may be disposed with the prism portion facing the discharge chamber and at a selected orientation with respect to the longitudinal cross section of the resonator, such that the prism portion of the grism may serve as a beam expanding prism.

In a fifth aspect, the grism may be configured to be disposed in the laser resonator as an output coupling element with either the grating surface or prism portion facing the discharge chamber, and, in either case, either the grating surface or prism portion serving as a partially reflecting resonator reflector surface. In this case, the surface that serves as the partially reflecting resonator reflector surface is partially reflecting and may be uncoated or coated, while the other surface has a dielectric AR coating on it.

BRIEF DESCRIPTION OF THE DRAWINGS

FIG. 2 schematically illustrates a ray path through a transmission grism.

FIG. 3a schematically illustrates a first embodiment of a laser resonator including a grism for line-narrowing and/or line-selection having a reflective grating surface facing the discharge chamber.

FIG. 3b schematically shows a preferred grism for use with the first embodiment of FIG. 3a having a dielectric HR coating on the grating surf ace.

FIG. 3c schematically shows a preferred grating which may be used with a line-narrowing and/or line-selection package of the preferred embodiment of FIG. 1 or instead of the grism of the first embodiment of FIG. 3a.

INCORPORATION BY REFERENCE

What follows is a cite list of references each of which is, in addition to those references cited above in the priority section, hereby incorporated by reference into the detailed description of the preferred embodiment below, as disclosing alternative embodiments of elements, or disclosing features of the preferred embodiments not otherwise set forth in detail below. A single one or a combination of two or more of these references may be consulted to obtain a variation of the preferred embodiments described in the detailed description below. Further patent, patent application and non-patent references are cited in the specification and are also incorporated by reference into the preferred embodiment with the same effect as just described with respect to the following references:

U.S. patent applications Ser. Nos. 09/317,695, 09/130, 277, 09/244,554, 09/317,527, 09/484,818, 60/140,531, 60/141,678, 60/147,219, 60/170,342, 60/178,445, 60/173, 993, 60/166,277, 60/166,967, 60/167,835, 60/170,919, and 60/202,564, and U.S. Pat. No. 5,761,236, each of which is assigned to the same assignee as the present application, and U.S. Pat. Nos. 5,652,681, 5,625,499, 5,999,318 and 4,803, 696; and E. G. Loewen, E. Popow; Diffraction Gratings and Applications, Marcel Dekkar (1997);

N. A. Finkelstein et al., A rectilinear transmission grating, JOSA 43, 335 (1953);

E. H. Geyer, B. Nelles; Double grating-prisms; Astr. Astraphys. 148, 312;

R. Hultzsch, Gitterprismen; Photonik, p. 40–41 (September 1998);

Wesley Traub, Constant-dispersion Grism Spectrometer for Channeled Spectra, J. Opt. Soc. of Am. A/Vol. 7, No. 9 (September 1990); and W. Demtroeder, Lawser Spectroscopy, Springer, Berlin Heidelberg, p. 112 (1996).

DETAILED DESCRIPTION OF THE PREFERRED EMBODIMENT

Figure 1:
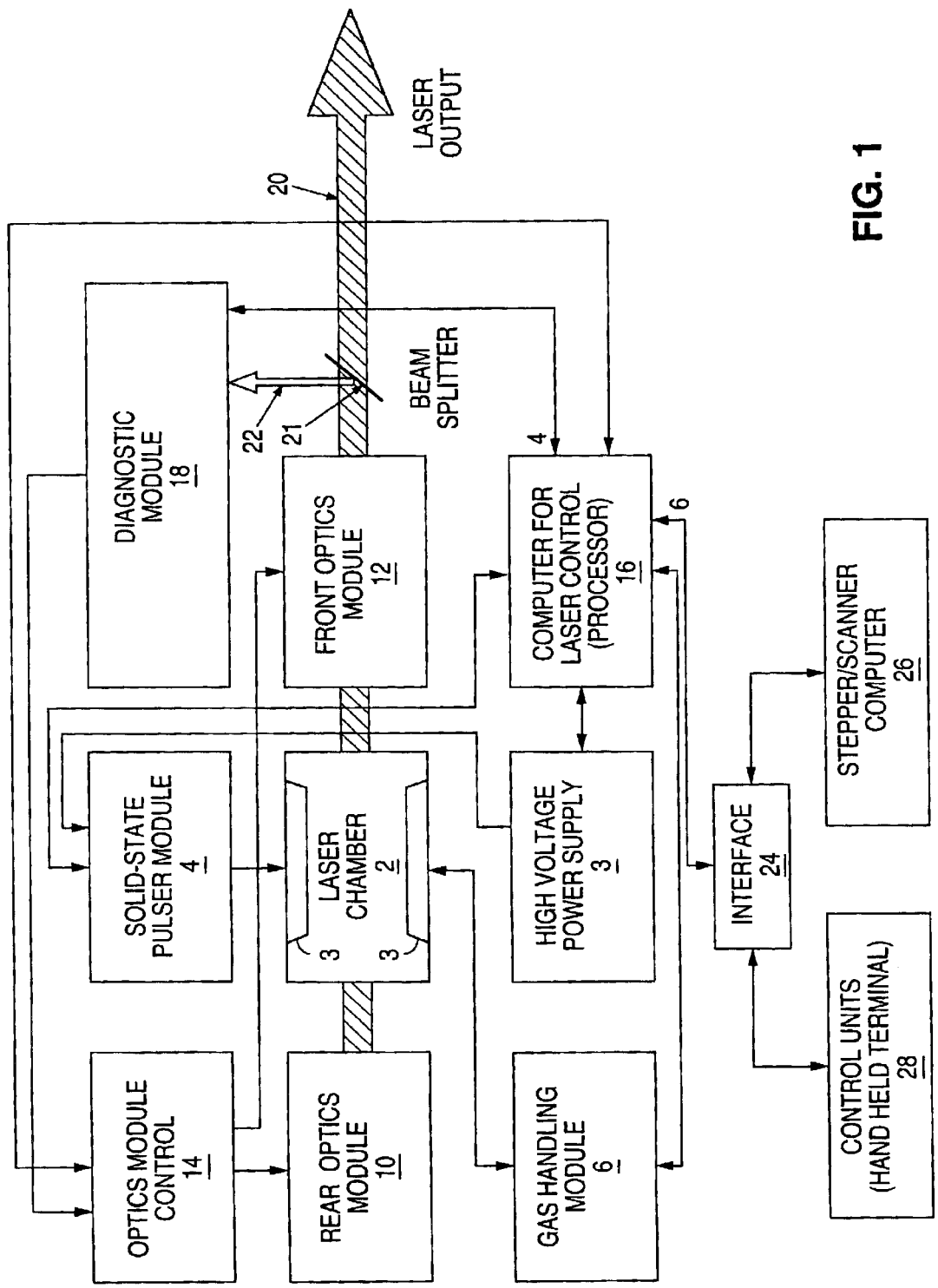
FIG. 1 schematically illustrates an excimer or molecular fluorine laser system in accord with a preferred embodiment.

Referring to FIG. 1, a DUV or VUV laser system, preferably an excimer, such as ArF or KrF, or molecular fluorine ($F_2$) laser system for deep ultraviolet (DUV) or vacuum ultraviolet (VUV) lithography, is schematically shown. Alternative configurations for laser systems for use in such other industrial applications as TFT annealing and/or micromachining, e.g., are understood by one skilled in the art as being similar to and/or modified from the system shown in FIG. 1 to meet the requirements of that application. For this purpose, alternative DUV or VUV laser system and component configurations are described at U.S. patent applications Ser. Nos. 09/317,695, 09/317,526, 09/130,277, 09/244,554, 09/452,353, 09/317,527, 09/343,333, 60/122,145, 60/140,531, 60/162,735, 60/166,952, 60/171,172, 60/141,678, 60/173,993, 60/166,967, 60/147,219, 60/170,342, 60/162,735, 60/178,445, 60/166,277, 60/167,835, 60/171,919, 60/202,564, 60/204,095, 60/172,674, and 60/181,156, and U.S. patent application of Kleinschmidt, serial number not yet assigned, filed May 18, 2000, for "Reduction of Laser Speckle in Photolithography by Controlled Disruption of Spatial Coherence of Laser Beam," and U.S. Pat. Nos. 6,005,880, 6,020,723, 5,946,337, 6,014,206, 5,559,816, 4,611,270, 5,761,236, each of which is assigned to the same assignee as the present application and is hereby incorporated by reference.

The system shown in FIG. 1 generally includes a laser chamber 2 having a pair of main discharge electrodes 3 connected with a solid-state pulser module 4, and a gas handling module 6. The solid-state pulser module 4 is powered by a high voltage power supply 8. The laser chamber 2 is surrounded by optics module 10 and optics module 12, forming a resonator. The optics modules 10 and 12 are controlled by an optics control module 14, or may be alternatively directly controlled by a computer 16.

The computer 16 for laser control receives various inputs and controls various operating parameters of the system. A diagnostic module 18 receives and measures one or more parameters of a split off portion of the main beam 20 via optics for deflecting a small portion of the beam toward the module 18, such as preferably a beam splitter module 21, as shown. The beam 20 is preferably the laser output to an imaging system (not shown) and ultimately to a workpiece (also not shown), may be output directly to a application process. The laser control computer 16 communicates through an interface 24 with a stepper/scanner computer 26 and other control units 28.

The laser chamber 2 contains a laser gas mixture and includes one or more preionization electrodes (not shown) in addition to the pair of main discharge electrodes 3. Preferred main electrodes 3 are described at U.S. patent applications Ser. Nos. 09/453,670, 60/184,705 and 60/128,227, each of which is assigned to the same assignee as the present application and is hereby incorporated by reference. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent applications Ser. Nos. 60/162,845, 60/160,182, 60/127,237, 09/535,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state pulser module 14 and high voltage power supply 8 supply electrical energy in compressed electrical pulses to the preionization and main electrodes 3 within the laser chamber 2 to energize the gas mixture. The preferred pulser module and high voltage power supply are described at U.S. patent application Ser. Nos. 60/149,392, 60/198,058, 60/204,095, 09/432,348 and 09/390,146, and U.S. patent application of Osmanow, et al., serial number not yet assigned, filed May 15, 2000, for "Electrical Excitation Circuit for Pulsed Laser", and U.S. Pat. Nos. 6,005,880 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of 3 Joules of electrical power (see the '988 patent, mentioned above).

The laser resonator which surrounds the laser chamber 2 containing the laser gas mixture includes optics module 10 including line-narrowing optics for a line narrowed excimer or molecular fluorine laser, which may be replaced by a high reflectivity mirror or the like in a laser system wherein either line-narrowing is not desired, or if line narrowing is performed at the front optics module 12, or a spectral filter external to the resonator is used, or if the line-narrowing optics are disposed in front of the HR mirror, for narrowing the linewidth of the output beam. Several variations of line-narrowing optics in accord with the preferred embodiment are set forth in more detail below with reference to FIGS. 2–7b.

The laser chamber 2 is sealed by windows transparent to the wavelengths of the emitted laser radiation 14. The windows may be Brewster windows or may be aligned at another angle to the optical path of the resonating beam. The beam path between the laser chamber and each of the optics modules 10 and 12 is sealed by enclosures 17 and 19, and the interiors of the enclosures is substantially free of water vapor, oxygen, hydrocarbons, fluorocarbons and the like which otherwise strongly absorb VUV laser radiation.

After a portion of the output beam 20 passes the outcoupler of the optics module 12, that output portion impinges upon beam splitter module 21 which includes optics for deflecting a portion of the beam to the diagnostic module 18, or otherwise allowing a small portion of the outcoupled beam to reach the diagnostic module 18, while a main beam portion 20 is allowed to continue as the output beam 20 of the laser system. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 18. A holographic beam sampler, transmission grating, partially transmissive reflection diffraction grating, grism, prism or other refractive, dispersive and/or transmissive optic or optics may also be used to separate a small beam portion 22 from the main beam 20 for detection at the diagnostic module 18, while allowing most of the main beam 20 to reach an application process directly or via an imaging system or otherwise.

The output beam 20 may be transmitted at the beam splitter module while a reflected beam portion 22 is directed at the diagnostic module 18, or the main beam 20 may be reflected, while a small portion 22 is transmitted to the diagnostic module 18. The portion of the outcoupled beam which continues past the beam splitter module 21 is the output beam 20 of the laser, which propagates toward an industrial or experimental application such as an imaging system and workpiece for photolithographic applications. Variations of beam splitter modules particularly for a molecular fluorine laser system are set forth at U.S. patent application Ser. No. 60/140,530, which is assigned to the same assignee and is hereby incorporated by reference.

Also particularly for the molecular fluorine laser system, and for the ArF laser system, an enclosure (not shown) may seal the beam path of the beams 22 and 20 such as to keep the beam paths free of photoabsorbing species. Smaller enclosures may seal the beam path between the chamber 2 and the optics modules 10 and 12. The preferred enclosure is described in detail in the U.S. patent application Ser. Nos. 09/343,333 and 60/140,530 applications, incorporated by reference above, and in U.S. patent application Ser. No. 09/131,580, which is assigned to the same assignee and U.S. Pat. Nos. 5,559,584, 5,221,823, 5,763,855, 5,811,753 and 4,616,908, all of which are hereby incorporated by reference.

The diagnostic module 18 preferably includes at least one energy detector. This detector measures the total energy of the beam portion that corresponds directly to the energy of the output beam 20. An optical configuration such as an optical attenuator, e.g., a plate or a coating, or other optics may be formed on or near the detector or beam splitter module 21 to control the intensity, spectral distribution and/or other parameters of the radiation impinging upon the detector (see U.S. patent applications Ser. Nos. 09/172,805, 60/172,749, 60/166,952 and 60/178,620, each of which is assigned to the same assignee as the present application and is hereby incorporated by reference).

One other component of the diagnostic module 18 is preferably a wavelength and/or bandwidth detection component such as a monitor etalon or grating spectrometer (see U.S. patent applications Ser. Nos. 09/416,344, 60/186,003, 60/158,808, and 60/186,096, and Lokai, et al., serial number not yet assigned, "Absolute Wavelength Calibration of Lithography Laser Using Multiple Element or Tandem See Through Hollow Cathode Lamp", filed May 10, 2000, each of which is assigned to the same assignee as the present application, and U.S. Pat. Nos. 4,905,243, 5,978,391, 5,450, 207, 4,926,428, 5,748,346, 5,025,445, and 5,978,394, all of the above wavelength and/or bandwidth detection and monitoring components being hereby incorporated by reference.

Other components of the diagnostic module may include a pulse shape detector or ASE detector, such as are described at U.S. patent applications Ser. Nos. 09/484,818 and 09/418, 052, respectively, each of which is assigned to the same assignee as the present application and is hereby incorporated by reference, such as for gas control and/or output beam energy stabilization. There may be a beam alignment monitor, e.g., such as is described at U.S. Pat. No. 6,014,206 which is hereby incorporated by reference.

The processor or control computer 16 receives and processes values of some of the pulse shape, energy, amplified spontaneous emission (ASE), energy stability, energy overshoot for burst mode operation, wavelength, spectral purity and/or bandwidth, among other input or output parameters of the laser system and output beam. The processor 16 also controls the line narrowing module to tune the wavelength and/or bandwidth or spectral purity, and controls the power supply and purser module 4 and 8 to control preferably the moving average pulse power or energy, such that the energy dose at points on the workpiece is stabilized around a desired value. In addition, the computer 16 controls the gas handling module 6 which includes gas supply valves connected to various gas sources.

The laser gas mixture is initially filled into the laser chamber 2 during new fills. The gas composition for a very stable excimer laser in accord with the preferred embodiment uses helium or neon or a mixture of helium and neon as buffer gas, depending on the laser. Preferred gas compositions are described at U.S. Pat. Nos. 4,393,405 and 4,977, 573 and U.S. patent applications Ser. Nos. 09/317,526, 09/513,025, 60/124,785, 09/418,052, 60/159,525 and 60/160,126, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas, may be added for increased energy stability and/or as an attenuator as described in the U.S. patent application Ser. No. 09/513,025 application incorporated by reference above. Specifically, for the F2-laser, an addition of xenon and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%.

Halogen and rare gas injections, total pressure adjustments and gas replacement procedures are performed using the gas handling module 6 preferably including a vacuum pump, a valve network and one or more gas compartments. The gas handling module 6 receives gas via gas lines connected to gas containers, tanks, canisters and/or bottles. Preferred gas handling and/or replenishment procedures of the preferred embodiment, other than as specifically described herein, are described at U.S. Pat. Nos. 4,977,573 and 5,396,514 and U.S. patent applications Ser. Nos. 60/124, 785, 09/418,052, 09/379,034, 60/171,717, and 60/159,525, each of which is assigned to the same assignee as the present application, and U.S. Pat. Nos. 5,978,406, 6,014,398 and 6,028,880, all of which are hereby incorporated by reference. A Xe gas supply may be included either internal or external to the laser system according to the '025 application, mentioned above.

A general description of the line-narrowing features of the several embodiments of the present is first provided here, followed by a detailed discussion referring FIGS. 2–7b. Exemplary line-narrowing optics contained in the optics module 10 include a beam expander, an optional etalon and a diffraction grating, which produces a relatively high degree of dispersion, for a narrow band laser such as is used with a refractive or catadioptric optical lithography imaging system. As mentioned above, the front optics module may include line-narrowing optics as well (see the U.S. patent application Ser. Nos. 60/166,277, 60/173,993 and 60/166,967 applications, each being assigned to the same assignee and hereby incorporated by reference). For a semi-narrow band laser such as is used with an all-reflective imaging system, and which is not the subject of the present invention, the grating Fen is replaced with a highly reflective mirror, and a lower degree of dispersion may be produced by a dispersive prism. A semi-narrow band laser would typically have an output beam linewidth in excess of 1 pm and may be as high as 100 pm in some laser systems, depending on the characteristic broadband bandwidth of the laser.

The beam expander of the above exemplary line-narrowing optics of the optics module 10 preferably includes one or more prisms. The beam expander may include other beam expanding optics such as a lens assembly or a converging/diverging lens pair. The grating or highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the U.S. patent application Ser. Nos. 60/178,445 and 09/317,527 applications, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent applications Ser. Nos. 09/317,695, 09/130,277, 09/244,554, 09/317,527, 09/073,070, 60/124,241, 60/140,532, 60/147,219 and 60/140,531, 60/147,219, 60/170,342, 60/172,749, 60/178,620, 60/173,993, 60/166,277, 60/166,967, 60/167,835, 60/170,919, 60/186,096, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

Optics module 12 preferably includes means for outcoupling the beam 20, such as a partially reflective resonator reflector. The beam 20 may be otherwise outcoupled such as by an intra-resonator beam splitter or partially reflecting surface of another optical element, and the optics module 12 would in this case include a highly reflective mirror. The optics control module 14 preferably controls the optics modules 10 and 12 such as by receiving and interpreting signals from the processor 16, and initiating realignment or reconfiguration procedures (see the '241, '695, 277, 554, and 527 applications mentioned above).

FIG. 2 shows a transmission grism 30 which is a term that derives from the combination of the terms grating and prism. The grism 30 has a prism portion 32 and a grating surface 34. An incident beam is shown entering the grism through a beam entry/exit surface 36 of the prism portion 32 and exiting the grism 30 through the grating surface 34. The principal order of the dispersion spectrum of the grating is shown continuing along its beam path, while outer portions of the spectral distribution of the incident beam are dispersed away from the beam path of the principal order. In this way, the grism 30 serves to spectrally narrow the incident beam. A grism may have a highly reflective surface and thus also serve, particularly in an excimer or molecular fluorine laser resonator, as a resonator reflector.

FIG. 3a schematically illustrates a first embodiment of a laser resonator including a grism 38 for line-narrowing and/or line-selection having a reflective grating surface 40 facing the discharge chamber 2. The resonator shown includes a prism beam expander 42 before the grism 38. A partially reflective mirror 44 is shown for outcoupling the beam at the other end of the resonator. The grism 38 may be rotated from the orientation shown, and may be rotatable for tuning the wavelength selected by the grating surface 40. Also, the grism 38 may be replaced with a grating 48 formed such as is shown at FIG. 3c, below, as a bar which may be shaped like a typical diffraction grating, i.e., wherein the prism portion 46 is excluded. Preferably, the grism 38 or bar or typical grating 48 used in the embodiment of FIG. 3a is made of $CaF_2$. The grooves are preferably either ruled directly into the $CaF_2$ bulk material or in an additional epoxy layer. The bandwidth for the arrangement shown in FIG. 3a is approximately given by formula (1), above.

FIG. 3b schematically shows a preferred grism 38 for use with the first embodiment of FIG. 3a having a dielectric HR coating on the grating surface 40. The grism 38 of FIG. 3b has the dielectric HR coating formed on the $CaF_2$ bulk, or on the ruled epoxy layer, or having a buffer layer in between the $CaF_2$ or epoxy layer. Advantageously, the dielectric HR surface over the grating surface 40 does not include a layer of aluminum as with conventional diffraction gratings. Thus, problems associated with aluminum layers on gratings, as discussed above, including absorption, aging and nonuniform heating, which tend to distort the wavefront of the incident beam, are substantially reduced.

FIG. 3c schematically shows a preferred grating 48 which may be used with a line-narrowing and/or line-selection package of the preferred embodiment of FIG. 1, or instead of the grism 38 of the first embodiment of FIG. 3a. The grating surface 50 has a dielectric HR coating as discussed with respect to the grating surface 40 of the grism 38 of FIGS. 3b–3c. The prism portion 46 which is part of the grism 38 of FIGS. 3a–3b is not included in the grating 48 of FIG. 3c. The grating surface 50 again has grooves ruled directly into the bulk material of the grating 48, preferably $CaF_2$, or has a ruled epoxy layer over a $CaF_2$ bar. The dielectric HR coating is formed over the ruled $CaF_2$ bulk or epoxy layer of the grating surface 50 of the grating 48.

Figure 4A:
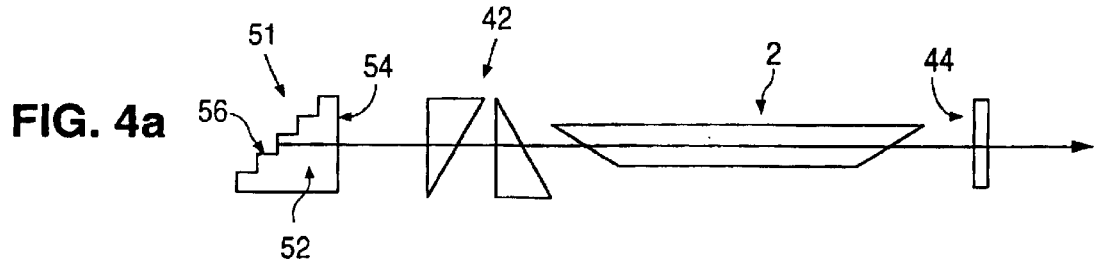
FIG. 4a schematically shows a second embodiment of a laser resonator including a grism for line-narrowing and/or line-selection having a transmissive prism portion including a beam entry/exit surface facing the discharge chamber.

FIG. 4a schematically shows a second embodiment of a laser resonator including a grism 51 for line-narrowing and/or line-selection having a transmissive prism portion 52 including a beam entry/exit surface 54 facing the discharge chamber 2. The reflective grating surface 56 of the grating is this time facing away from the discharge chamber 2 as opposed to the grism 38 shown in FIGS. 3a–3b. Thus, the grism 51 acts as a diffraction grating with light reflection at the back side, wherein the dispersion occurs in the material of the grism 51 having a refractive index n. The resonator shown again includes a prism beam expander 42 and a partially reflecting outcoupler 44.

Figure 4B:
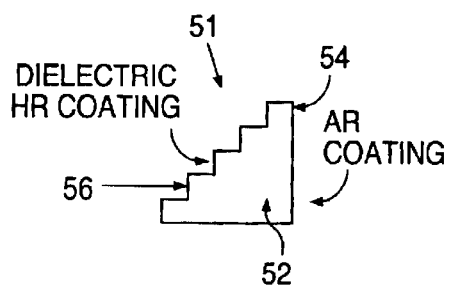
FIG. 4b schematically shows a preferred grism for use with the second embodiment of FIG. 4a having a dielectric AR coating on the beam entry/exit surface and a dielectric HR coating on the grating surface.

FIG. 4b schematically shows a preferred grism 51 for use with the second embodiment of FIG. 4a. The grism preferably has a dielectric AR coating on the beam entry/exit surface 54 to avoid optical losses from reflections at the surface 54. The grating surface 56 of the grism 51 preferably has a dielectric HR coating formed thereon. The grating surface 56 is otherwise preferably the same as that described for the grating surface 40 of the grism 38 of FIG. 3b. Preferably, the dielectric HR coating of the grism 51 of FIG. 4a is formed directly onto the ruled $CaF_2$ bulk material and no epoxy is used, since there may otherwise be losses at epoxy interfaces in this embodiment. The bandwidth for this second embodiment is the same as that set forth at formula (1) above, except that the bandwidth is further reduced by a factor of n, or the index of refraction of the material making up the prism portion 52.

Figure 5A:
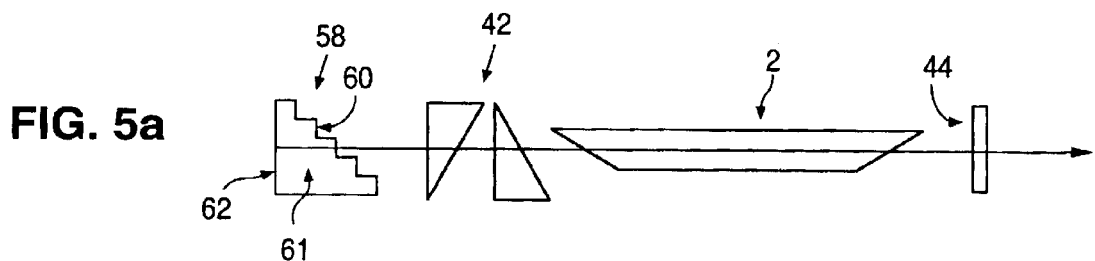
FIG. 5a schematically shows a third embodiment of a laser resonator including a grism for line-narrowing and/or selection having a transmissive grating surface facing the discharge chamber.

FIG. 5a schematically shows a third embodiment of a laser resonator including a grism 58 for line-narrowing and/or selection. The grism has a transmissive grating surface 60 facing the discharge chamber 2. The grism 58 further includes a prism portion 61 having a highly reflective back surface 62 serving as a resonator reflector surface. The resonator shown also includes a prism beam expander 42 and a partially reflecting output coupler 44.

Figure 5B:
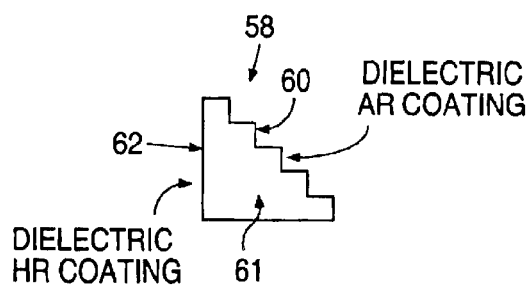
FIG. 5b schematically shows a preferred grism for use with the third embodiment having a dielectric AR coating on the grating surface and a dielectric HR coating on a rear surface of a prism portion.

FIG. 5b schematically shows a preferred grism 58 for use with the third embodiment of FIG. 5a. The preferred grism 58 has a dielectric AR coating on the grating surface 60 for avoiding reflection losses. The grism 58 of FIG. 5b further has a dielectric HR coating on the rear surface 62 of the prism portion 61. Thus, the grism 58 acts as a transmission grating with an additional prism portion 61 having a highly reflecting back surface 62.

Figure 6A:
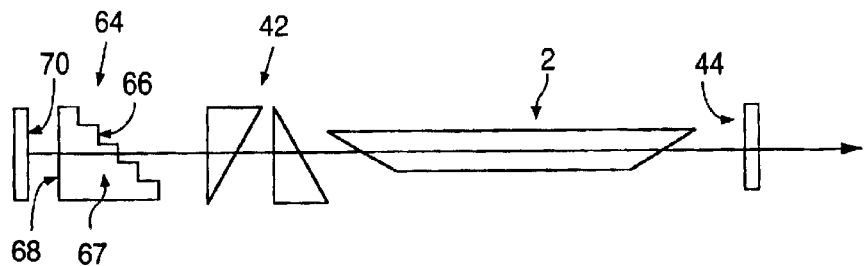
FIG. 6a schematically shows a fourth embodiment of a laser resonator including a grism for line-narrowing and/or selection having a transmissive grating surface facing the discharge chamber and a transmissive beam entry/exit surface of a prism portion.

FIG. 6a schematically shows a fourth embodiment of a laser resonator including a grism 64 for line-narrowing and/or selection. The grism 64 has a transmissive grating surface 66 and a prism portion 67 having a transmissive beam entry/exit surface 68. A highly reflective mirror 70 is shown after the transmission grism to serve as a highly reflective resonator reflector. The resonator shown also includes a prism beam expander 42 before the grism 64 and a partially reflective outcoupler 44.

Figure 6B:
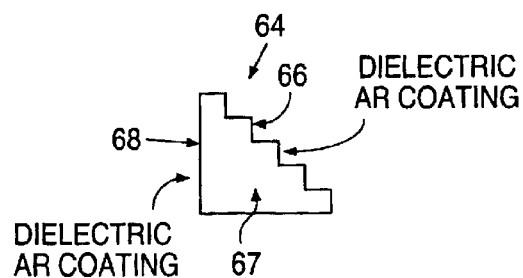
FIG. 6b schematically shows a preferred grism for use with the fourth embodiment having a dielectric AR coating on the grating surface and on the beam entry/exit surface of the prism portion.

FIG. 6b schematically shows a preferred grism 64 for use with the fourth embodiment. The grism of FIG. 6b has a dielectric AR coating on the grating surface 66 and also on the beam entry/exit surface 68 of the prism portion 67.

Figure 7A:
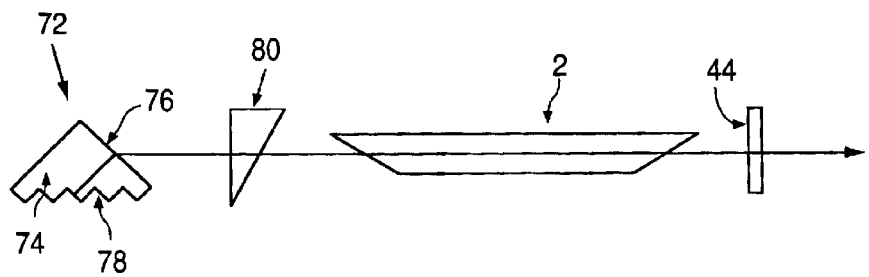
FIG. 7a schematically shows a fifth embodiment of a laser resonator including a grism for line-narrowing and/or selection having a transmissive beam entry exit surface of a prism portion facing the discharge chamber, wherein the prism portion serves as a beam expander.

FIG. 7a schematically shows a fifth embodiment of a laser resonator including a grism 72 for line-narrowing and/or selection. The grism 72 has a prism portion 74 including a transmissive beam entry exit surface 76 facing the discharge chamber 2. The beam is refracted at the surface 76 because the beam is incident at an angle other than 90° is this embodiment. Thus, the prism portion 74 serves as a beam expanding prism. The grism 72 also has a highly reflecting grating surface 78.

The resonator of FIG. 7a also includes the remainder of the prism beam expander 80, which works together with the prism portion 74 of the grism 72 to expand the beam. In this case, only one prism is shown in the beam expander 80, whereas two are shown in the beam expanders 42 of the first-fourth embodiments whose grisms 38, 51, 58 and 64 have prism portions 46, 52, 61 and 67, respectively, that do not serve to expand the beam. That is, the beam does not enter prism portion 46 of FIG. 3a, and the beam is incident at a 90° angle to the surface 54 and 68 of FIGS. 4a and 6a, respectively, while the back surface 52 of FIG. 5a is highly reflective.

Figure 7B:
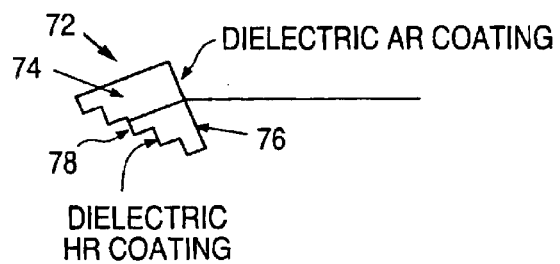
FIG. 7b schematically shows a preferred grism for use with the fifth embodiment having a dielectric AR coating on the beam entry/exit surface of the prism portion and a dielectric HR coating on a grating surface.

FIG. 7b schematically shows a preferred grism 74 for use with the fifth embodiment. The grism 74 of FIG. 7b has a dielectric AR coating on the beam entry/exit surface 76 of the prism portion 74. The grism 74 also has a dielectric HR coating on a grating surface 78.

It is noted here that the number of prisms in the beam expanders 42 and/or 80 of FIGS. 3a, 4a, 5a, 6a and 7a may be more or less than those shown. In addition, the grisms 51 and 64 of FIGS. 4a and 6a, respectively, may be oriented such that their respective prism portions 52 and 67 do serve to refract the beam. In addition, the grism 64 of FIG. 6a may be turned around such that the prism portion 67 faces the discharge chamber 2. That prism portion 67 may be oriented to refract and expand the beam, i.e., such that the beam is not incident at a 90° angle, but instead at an angle between, e.g., 50° and 80°, such as preferably between 65° and 75°.

In all of the above embodiments shown and described with reference to FIGS. 1–7, the material used for the prisms of the beam expanders, transmissive gratings or grisms, and laser windows is preferably one that is highly transparent at wavelengths of interest, such as 248 nm for the krF laser, 193 nm for the ArF laser and 157 nm for the molecular fluorine laser. One or more etalons may be included in these resonator arrangements for further line-narrowing and/or selection made of a similar such material. The materials are also capable of withstanding long-term exposure to ultraviolet light with minimal degradation effects. Examples of such materials are $CaF_2$, $MgF_2$, BaF, $BaF_2$, LiF, $LiF_2$, $SrF_2$, quartz and fluroine-doped quartz. Also, in all of the above embodiments of FIGS. 1–7, many optical surfaces, particularly those of the prisms or etalons, preferably have an anti-reflective coating on one or more optical surfaces, in order to minimize reflection losses and prolong their lifetimes.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

For example, although the several embodiment described above include a grating or a grism disposed in the laser resonator on the opposite side of the discharge chamber 2 as the output coupler, a grism or grating may be disposed on the same side of the discharge chamber as the output coupler. In fact, the grating or grism may serve as the outcoupling element of the system, wherein the grating surface or back surface of the prism portion may be the partially reflective resonator reflector surface, and the bulk of the grating or grism may be disposed inside or outside of the resonator. In addition, the resonator may include two highly reflecting resonator reflectors, and output coupling may be performed by reflection from an angled surface within the resonator, e.g., as described at U.S. Pat. No. 5,370,150, which is hereby incorporated by reference into the present application, wherein the grating or grism may be disposed on either side of the discharge chamber. In addition, more than one grating and/or grism may be included in the laser resonator.

What is claimed is:

1. An excimer or molecular fluorine laser system, comprising:
 a laser chamber filled with a gas mixture at least including a halogen-containing species and a buffer gas;
 a plurality of electrodes within the laser chamber connected to a discharge circuit energizing the gas mixture;

a laser resonator defining a beam path and including the laser chamber and a line-narrowing and/or line-selection package generating an output beam with a bandwidth less than 1 pm;

the laser resonator including a grating element having a dielectric highly reflective (HR) coating formed thereon, the grating element including a plurality of grooves, the grating element selecting a narrow band from a broader spectral distribution to continue along said beam path after being incident upon said grating element, the grating element dispersing outer portions of said spectral distribution away from the beam path.

2. An excimer or molecular fluorine laser system, comprising:

a laser chamber filled with a gas mixture at least including a halogen-containing species and a buffer gas;

a plurality of electrodes within the laser chamber connected to a discharge circuit energizing the gas mixture;

a laser resonator including the laser chamber and a line-narrowing and/or line-selection package generating an output beam with a bandwidth less than 1 pm;

the laser resonator including a grating element having a dielectric anti-reflective (AR) coating formed thereon, the grating element including a plurality of grooves, the grating element selecting a narrow band from a broader spectral distribution to continue along said beam path after being incident upon said grating element, the grating element dispersing outer portions of said spectral distribution away from the beam path.

3. The laser system of claim 2, wherein the grating element is disposed in front of a resonator reflector element.

4. The laser system of claim 3, wherein the resonator reflector element is highly reflective.

5. The laser system of claim 3, wherein the resonator reflector element is partially reflective as an output coupler.

6. An excimer or molecular fluorine laser system, comprising:

a laser chamber filled with a gas mixture at least including a halogen-containing species and a buffer gas;

a plurality of electrodes within the laser chamber connected to a discharge circuit energizing the gas mixture;

a laser resonator including the laser chamber and a line-narrowing and/or line-selection package generating an output beam with a bandwidth less than 1 pm;

the laser resonator including a grism element for dispersing the beam, said grism element having a grating surface and a prism portion, the grating surface including a plurality of grooves, the grism element selecting a narrow band from a broader spectral distribution to continue along said beam path after being incident upon said grism element, the grism element dispersing outer portions of said spectral distribution away from the beam path.

7. The laser system of claim 6, having a dielectric AR coating formed on the grism element.

8. The laser system of claim 7, wherein the dielectric AR coating is formed on the grating surface.

9. The laser system of claim 8, wherein a dielectric HR coating is formed on a rear surface of the prism portion.

10. The laser system of claim 7, wherein a dielectric AR coating is formed on a rear surface of the prism portion.

11. The laser system of claim 10, wherein a dielectric HR coating is formed on the grating surface.

12. The laser system of claim 10, wherein a dielectric AR coating is formed on the grating surface.

13. The laser system of claim 6, having a dielectric HR coating formed on the grism element.

14. The laser system of claim 13, wherein the dielectric HR coating is formed on the grating surface.

15. The laser system of claim 13, wherein the dielectric HR coating is formed on a rear surface of the prism portion.

16. The laser system of claim 6, wherein the grism element has a highly reflecting surface for reflecting the beam as a highly reflective resonator reflector.

17. The laser system of claim 16, wherein the grating surface is the highly reflecting surface, and the grating surface faces the laser discharge chamber.

18. The laser system of claim 16, wherein the grating surface is the highly reflecting surface, and the prism portion faces the laser discharge chamber.

19. The laser system of claim 16, wherein a rear surface of the prism portion is the highly reflecting surface, and the grating surface faces the laser discharge chamber.

20. The laser system of claim 6, wherein the grism element is disposed in the laser resonator in front of a highly reflective resonator reflector.

21. The laser system of claim 20, wherein the grating surface has a dielectric AR coating formed thereon.

22. The laser system of any of claims 16, 18 or 20–21, wherein a beam entry/exit surface of the prism portion has a dielectric AR coating formed thereon.

23. The laser system of claim 22, wherein the grating surface has a dielectric HR coating formed thereon.

24. The laser system of any of claims 16–18, wherein the grating surface has a dielectric HR coating formed thereon.

25. The laser system of any of claims 6, 16, 18 or 20, wherein the grism element is oriented such that the prism portion serves as a beam expander.

26. The laser system of claim 6, wherein the grism element is disposed in the laser resonator in front of a partially reflective resonator output coupler.

27. The laser system of claim 26, wherein the grating surface has a dielectric AR coating formed thereon.

28. The laser system of any of claims 26–27, wherein a beam entry/exit surface of the prism portion has a dielectric AR coating formed thereon.

29. The laser system of claim 6, wherein the grism is disposed within the laser resonator to serve as an output coupling element.

30. The laser system of claim 29, wherein the grating surface faces the laser discharge chamber and has a dielectric AR coating formed thereon.

31. The laser system of claim 29, wherein an entry exit surface of the grism faces the discharge chamber and has a dielectric AR coating formed thereon.

32. The laser system of claim 29, wherein the grating surface faces the laser discharge chamber and is partially reflective such that the grating surface serves as a resonator reflector surface.

33. The laser system of claim 29, wherein a rear surface of the prism portion faces the discharge chamber and is partially reflecting such that the rear surface of the prism portion serves as a resonator reflector surface.

34. The laser system of any of claims 6 or 16–21, further comprising a beam expander between the discharge chamber and the grism element.

35. The laser system of claim 34, wherein the beam expander includes a plurality of DUV and/or VUV transparent prisms.

36. The laser system of claim 35, wherein said plurality of prisms each has at least one dielectric AR coating formed thereon.

37. The laser system of claim 34, further comprising an aperture disposed between the discharge chamber and the beam expander.

38. The laser system of claim 34, further comprising an etalon within the resonator for further line-narrowing and/or line-selection.

39. The laser system of any of claim 1 or 2, wherein the grating element further comprises a bulk substrate having a plurality of grooves formed directly therein, wherein the dielectric coating is formed directly over said substrate and plurality of grooves.

40. The laser system of any of claim 1 or 2, wherein the grating element further comprises a bulk substrate having a ruled epoxy layer formed thereon having a plurality of grooves, wherein the dielectric coating is formed directly over said ruled epoxy layer.

41. The laser system of any of claim 1 or 2, wherein the grating element further comprises a bulk substrate having said plurality of grooves formed directly therein.

42. The laser system of any of claim 1 or 2, wherein the grating element further comprises a bulk substrate having a ruled epoxy layer formed thereon having said plurality of grooves.

43. An excimer or molecular fluorine laser system, comprising:

a laser chamber filled with a gas mixture at least including a halogen-containing species and a buffer gas;

a plurality of electrodes within the laser chamber connected to a discharge circuit energizing the gas mixture;

a laser resonator including a line-narrowing and/or line-selection package generating a laser beam, the laser resonator including a grism element formed from a DUV and/or VUV transparent material, said grism having a prism portion and a grating surface, the grating surface including a plurality of grooves, wherein the surface closest to the discharge chamber has an AR coating formed thereon, the grism element selecting a narrow band from a broader spectral distribution to continue along said beam path after being incident upon said grism element, the grism element dispersing outer portions of said spectral distribution away from the beam path.

44. The laser system of claim 43, wherein said surface closest to said discharge chamber is said grating surface.

45. The laser system of claim 44, wherein a rear surface of said prism portion has a HR coating formed thereon.

46. The laser system of claim 44, wherein a beam entry/exit surface of said prism portion has an AR coating formed thereon, wherein said laser system further comprises a highly reflective resonator reflector after said grism.

47. The laser system of claim 44, wherein a rear surface of said prism portion is partially reflecting such that said rear surface serves as a beam output coupler of the laser system.

48. The laser system of claim 43, wherein said surface closest to said discharge chamber is a beam entry/exit surface of said prism portion.

49. The laser system of claim 48, wherein said grating surface has a HR coating formed thereon.

50. The laser system of claim 48, wherein said grating surface has an AR coating formed thereon, wherein said laser system further comprises a highly reflective resonator reflector after said grism.

51. The laser system of claim 48, wherein said grating surface is partially reflecting such that said grating surface serves as a beam output coupler of the laser system.

52. An excimer or molecular fluorine laser system, comprising:

a laser chamber filled with a gas mixture at least including a halogen-containing species and a buffer gas;

a plurality of electrodes within the laser chamber connected to a discharge circuit energizing the gas mixture;

a laser resonator including a line-narrowing and/or line-selection package generating a laser beam, the laser resonator including a grism element formed from a DUV and/or VUV transparent material, said grism having a prism portion and a grating surface, the grating surface including a plurality of grooves, wherein the surface closest to the laser chamber is partially reflecting and serves as a beam output coupler of said laser system, the grism element selecting a narrow band from a broader spectral distribution to continue along said beam path outside the laser resonator after being incident upon said grism element, the grism element dispersing outer portions of said spectral distribution away from the beam path.

53. The laser system of claim 52, wherein said partially reflecting surface is said grating surface.

54. The laser system of claim 52, wherein said partially reflecting surface is a rear surface of said prism portion and said outcoupled beam exits said grism through said grating surface.

55. The laser system of any of claims 6, 43 or 52, further comprising a bulk substrate having said plurality of grooves formed directly therein, wherein the dielectric coating is formed directly over said substrate and plurality of grooves.

56. The laser system of any of claims 6, 43 or 52, further comprising a bulk substrate having a ruled epoxy layer formed thereon having said plurality of grooves, wherein the dielectric coating is formed directly over said ruled epoxy layer.

57. The laser system of any of claims 6, 43 or 52, further comprising a bulk substrate having said plurality of grooves formed directly therein.

58. The laser system of any of claims 6, 43 or 52, further comprising a bulk substrate having a ruled epoxy layer formed thereon having said plurality of grooves.

* * * * *